UNITED STATES PATENT OFFICE.

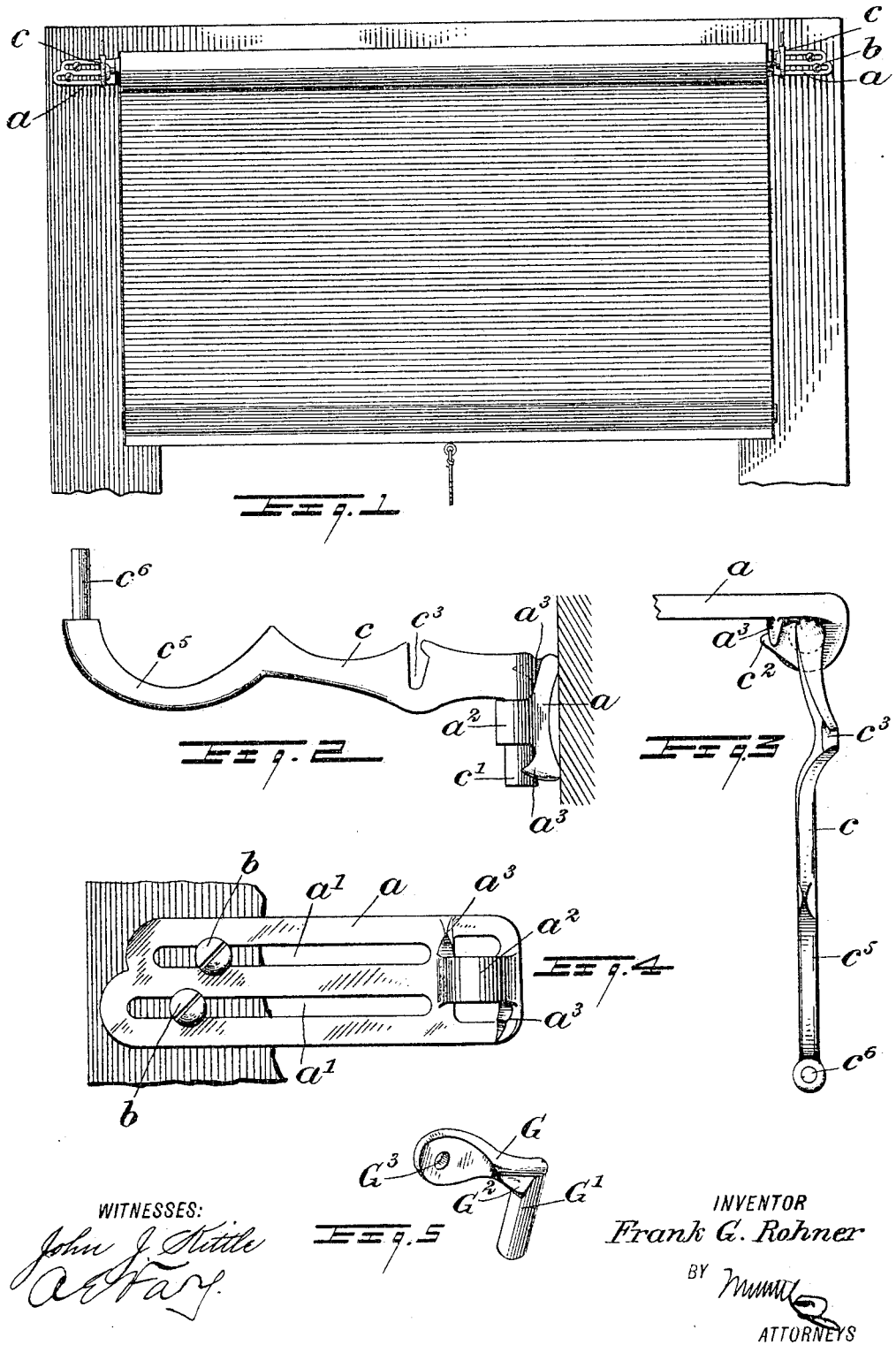

FRANK GEORGE ROHNER, OF DUBUQUE, IOWA.

SHADE-FIXTURE.

No. 798,832. Specification of Letters Patent. Patented Sept. 5, 1905.

Application filed October 15, 1904. Serial No. 228,534.

*To all whom it may concern:*

Be it known that I, FRANK GEORGE ROHNER, a citizen of the United States, and a resident of Dubuque, in the county of Dubuque and State of Iowa, have invented a new and Improved Shade-Fixture, of which the following is a full, clear, and exact description.

In rented houses every tenant ordinarily secures new sets of shade and curtain fixtures for the window-casings, and after a few changes the latter become greatly disfigured.

It is the chief object of my invention to provide permanent fixtures which can be adjusted to support any shade or curtain that is likely to be used. In order to accomplish this result, I provide a plate to be adjustably secured to the window-casing or the like and a bracket adapted to be supported by the plate and in turn adapted to support the shade.

Reference is to be had to the accompanying drawings, forming a part of this specification, in which similar characters of reference indicate corresponding parts in all the figures.

Figure 1 is a front elevation of a portion of a window-casing, showing one form of my invention applied thereto. Fig. 2 is a side elevation of one of the fixtures on an enlarged scale. Fig. 3 is a plan view of one of the fixtures. Fig. 4 is a front elevation of a plate for supporting a bracket, and Fig. 5 is a perspective view of another form of bracket which comes within the scope of my invention.

The supporting-plate $a$ is provided with one or more longitudinal slots $a'$. Two of these slots are shown in the drawings, and they are illustrated as being parallel and slightly offset, so that screws $b$ or other fastening devices, which are passed through the slots in order to hold the plate, may be secured to the woodwork out of alinement with each other, thus avoiding cracking the woodwork and providing for a better support of the plate. The plate is provided with a socket $a^2$ for supporting the bracket $c$. This bracket has a stud $c'$, adapted to be supported in the socket $a^2$ in an obvious manner, the lower portion of the bracket $c$ resting upon the top of the socket. The plate is also provided with a pair of stops $a^3$, preferably upon opposite sides of the socket, to prevent the bracket from swinging beyond a position in which it will be perpendicular to the wall, and the bracket is provided with a projection $c^2$ upon one side adapted to engage with one of these stops. It will be observed that on account of having two stops, one upon each side of the socket, the plate is reversible, and the stops will act in the same way irrespective of the side of the plate which is located at the top. It will consequently not be necessary to make a change of brackets when the plates are reversed.

The bracket is provided with a slot $c^3$ for holding the end of the shade-roller. It is also provided with a projecting portion $c^5$ for supporting a wooden curtain-pole and a tube or extension-rod $c^6$ for use in supporting a brass tube-extension curtain-pole. The description so far given applies to Figs. 2, 3, and 4.

The form of bracket shown in Fig. 5 is intended for use when the extension for supporting the curtain-pole is not desired, and this form comprises a bracket G, having a stud G' for engaging with the socket $a^2$ and a projection $G^2$ for use similar to that of the projection $c^2$. The bracket is also provided with an eye $G^3$ for holding the end of the shade-roller.

It will be readily understood that the brackets are preferably rights and lefts for use in the ordinary style of shades, because the slot $c^3$ is used upon one side and a perforation $G^3$ upon the other. The plates, however, may be made all alike and do not need to be distinguished as rights and lefts. It will be apparent that these brackets may be put up permanently and that by simply loosening the screws $b$ they may be adjusted back and forth or, if necessary, reversed by removing the screws and inserting them again after the brackets are secured, and upon putting up new shades or curtains all that will be necessary is a simple adjustment which can be performed without placing any additional holes in the woodwork. Even when the bracket is reversed the screws may be inserted in the same places and no additional holes need be made. It will be seen that a very effective device for accomplishing the desired purposes has thus been produced.

While I have illustrated and described a particular embodiment of my invention, it is to be understood that the latter is not strictly limited to that embodiment, but may be constructed in many other forms.

Having thus described my invention, I claim as new and desire to secure by Letters Patent—

1. In a shade-fixture, the combination of a plate having means for securing it to a window-casing or the like and provided with a socket, and stops on opposite sides of the socket, with a bracket having a stud adapted to be received in said socket, a projection adapted to engage with one of said stops, and a plurality of means for receiving curtain-poles.

2. In a shade-fixture, the combination of a reversible plate having two parallel slots for the reception of fastening-screws, and provided with a socket, and stops adjacent to said socket on opposite sides thereof, with a bracket having a stud adapted to be received in said socket, a projection for engaging with said stops in either position of the bracket, means for holding the end of a shade-roller, and means for receiving a curtain-pole.

3. A shade-fixture, comprising a plate adapted to be reversibly and adjustably secured to a window-casing and to support a shade or curtain bracket, said plate being provided with two parallel slots for the reception of fastening devices, with a socket for the reception of a bracket, and with stops for preventing the bracket from assuming a position more than ninety degrees from the plane of the plate in one direction.

In testimony whereof I have signed my name to this specification in the presence of two subscribing witnesses.

FRANK GEORGE ROHNER.

Witnesses:
C. B. TREWIN,
C. ROHNER.